E. B. JUCKET.
HOSE COUPLING.
No. 37,721. Patented Feb. 17, 1863.
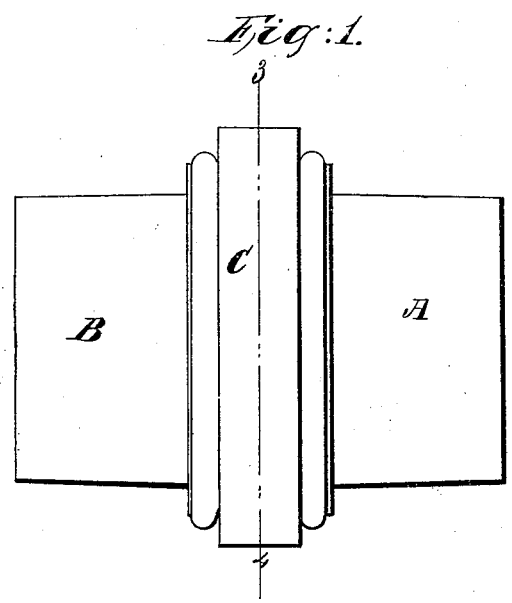
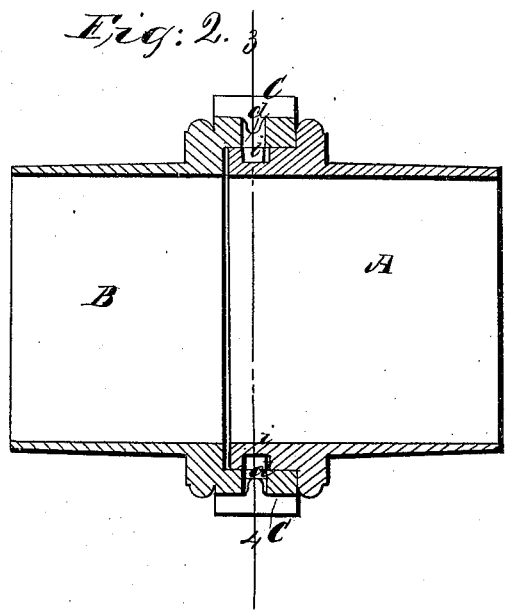
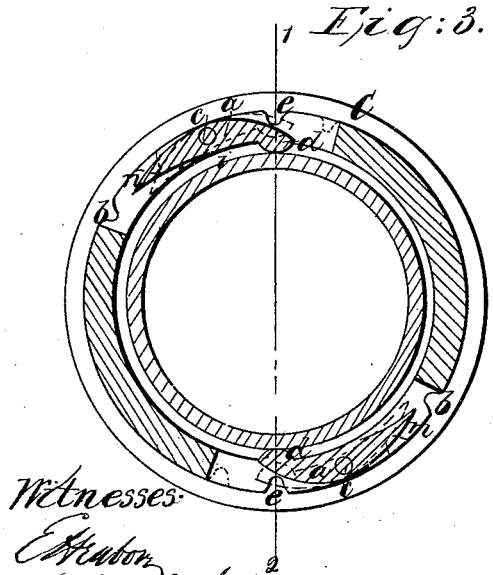
Witnesses:
Inventor:
E. B. Jucket
By his Atty.
John E. Earl

UNITED STATES PATENT OFFICE.

EDMUND B. JUCKET, OF NEW HAVEN, CONNECTICUT, ASSIGNOR TO HIMSELF AND JOHN W. DE LAMETER, OF NEW YORK, N. Y.

IMPROVEMENT IN HOSE-COUPLINGS.

Specification forming part of Letters Patent No. 37,721, dated February 17, 1863.

*To all whom it may concern:*

Be it known that I, EDMUND B. JUCKET, of the city and county of New Haven, and State of Connecticut, have invented certain new and useful Improvements in Hose-Couplings; and I do hereby declare the following to be a full, clear, and exact description of the construction and operation of the same, reference being had to the accompanying drawings, forming a part of this specification, in which—

Figure 1 is a side view representing the two parts as coupled together. Fig. 2 is a longitudinal section of the same, taken through 1 2. Fig. 3 is a transverse section cutting through 3 4.

Same letters refer to like parts.

My invention consists in a device for locking together the two parts of a hose-coupling without the aid of a wrench.

To enable others skilled in the art to make and use my invention, I will proceed to describe its construction and operation.

A B are sleeves, to be inserted and firmly fixed in the ends of the two pieces of hose which it is desired to couple together. The outer end of the sleeve A is enlarged (as see Fig. 3) to form the male and a corresponding enlargement on the sleeve B forms the female part of the coupling. In the female part B are hung one or more levers, *a*, with their fulcrums at *c*. One end, *d*, of each of the levers *a* is made wedge-shaped, as see Fig. 2.

C is a ring, or its equivalent, surrounding the female part of the coupling, and turns thereon, and has on its inner surface cams *b b* and *e e*, for the purpose of operating the levers *a*. Around the male part of the coupling is formed a groove, *i*, (see Fig. 2,) one of its sides inclined to correspond with the inclination of the wedge-shaped end *d* of the levers *a*. P is a ring of packing between the two parts of the coupling.

In Fig. 3 the parts are shown as coupled and locked together, the cams *e* pressing upon the levers *a*. To separate the two parts, turn the ring C in the direction denoted by the arrows, in which operation the cams *e* will leave the levers *a* and the cams *b* come to and press down upon the opposite end of the levers, forcing them into the position denoted in red, Fig. 3. This operation will draw the wedge-shaped end *d* out of the groove *i* and release the male part, so that it may be removed.

To unite or couple the two parts, when the levers *a* are in the position denoted in red, Fig. 3, and as left in the last-described operation, insert the male part A within the female part B, turn the ring C in the opposite direction to that denoted by arrows, in which operation the cams *b* will leave the levers and the cams *e* come upon and force the end *d* into the groove *i* of the male part, which, by its wedge-shape and the corresponding incline in the groove *i*, will force the male part up to and firmly against the packing P. This done, the hose is ready for use. In this last-described operation of locking no power is required other than can easily be produced by the application of the hand to the ring C. Thus I save the time usually occupied in using the wrench, consequently am enabled to couple hose much quicker than by any known method. So great is the power of the ring C on the levers that I sometimes find it difficult to uncouple after use in consequence of the levers having been forced so firmly into the groove, and require, in such case, more power than was used in locking. To provide against such difficulty, I make a hole in the ring C, by which to apply a wrench to aid in unlocking. This is never required in coupling, and seldom in uncoupling.

Having thus fully described my invention, what I claim therein as new and useful, and desire to secure by Letters Patent, is—

1. The lever or levers *a*, when the same are combined with hose-couplings, in the manner and for the purpose substantially as herein set forth.

2. The combination and arrangement described of the lever or levers *a* and ring C with hose-couplings, when the same are made to operate substantially as herein specified.

E. B. JUCKET.

Witnesses:
JOHN E. EARLE,
E. L. FAIRCHILD.